United States Patent
Deiss (10) Patent No.: US 12,311,628 B2
(45) Date of Patent: May 27, 2025

(54) METHOD FOR PRODUCING A SEALING TAPE ROLL AND SEALING TAPE

(71) Applicant: ISO-Chemie GmbH, Aalen (DE)

(72) Inventor: Martin Deiss, Abtsgmuend (DE)

(73) Assignee: ISO-Chemie GmbH, Aalen (DE)

( * ) Notice: Subject to any disclaimer, the term of this patent is extended or adjusted under 35 U.S.C. 154(b) by 1284 days.

(21) Appl. No.: 16/667,084

(22) Filed: Oct. 29, 2019

(65) Prior Publication Data

US 2020/0140723 A1    May 7, 2020

(30) Foreign Application Priority Data

Nov. 7, 2018    (EP) ..................... 18204851

(51) Int. Cl.
*B29D 99/00*    (2010.01)
*B65H 18/28*    (2006.01)

(52) U.S. Cl.
CPC ......... *B29D 99/0053* (2013.01); *B65H 18/28* (2013.01)

(58) Field of Classification Search
None
See application file for complete search history.

(56) References Cited

U.S. PATENT DOCUMENTS

| | | | |
|---|---|---|---|
| 6,214,147 B1 * | 4/2001 | Mortellite | B65H 23/035 156/271 |
| 2019/0070842 A1 * | 3/2019 | Deiss | B32B 37/20 |

FOREIGN PATENT DOCUMENTS

| | | | |
|---|---|---|---|
| CH | 696182 A5 * | 2/2007 | ............ A41F 9/002 |
| DE | 35 44 277 C1 | 12/1985 | |
| DE | 19955839 C1 | 3/2001 | |
| DE | 20 2012 101 990 U1 | 8/2013 | |
| DE | 2 990 551 A1 | 3/2016 | |
| DE | 2 990 552 A1 | 7/2018 | |
| EP | 2 423 396 A2 | 2/2012 | |
| EP | 2 990 551 A1 | 3/2016 | |
| EP | 3 124 712 A1 | 2/2017 | |
| EP | 3 260 617 A1 | 12/2017 | |
| EP | 2 990 552 A1 | 7/2018 | |
| EP | 3 346 068 A1 | 7/2018 | |

OTHER PUBLICATIONS

Machine English translation of EP3124712, Accessed May 16, 2022 (Year: 2017).*
Machine English translation of EP2423396, Accessed May 16, 2022 (Year: 2012).*
Machine English translation of CH696182, Accessed May 16, 2022 (Year: 2007).*
EP 18 20 4851 Search Report dated May 6, 2019.

* cited by examiner

*Primary Examiner* — Jacob T Minskey
*Assistant Examiner* — Adrianna N Konves
(74) *Attorney, Agent, or Firm* — Jansson Munger & McKinley Ltd.

(57) ABSTRACT

A method for producing a sealing tape roll comprises the steps of providing a foam-barrier layer web comprising a plurality of foam strips, wherein a barrier layer is arranged between each pair of adjustment foam strips; applying a cover layer to the foam-barrier layer web; parting the cover layer in the longitudinal direction in an area of at least two foam strips and a certain distance away from each barrier layer adjacent to these foam strips, thus forming subsections of the cover layer, wherein a subsection of the cover layer at least partially covers two adjacent foam strips; and forming a sealing tape roll from the coated foam-barrier layer web.

13 Claims, 6 Drawing Sheets

METHOD FOR PRODUCING A SEALING TAPE ROLL AND SEALING TAPE

FIELD OF THE INVENTION

The present invention relates to a method for producing a sealing tape roll with a plurality of interior barrier layers and to a corresponding sealing tape.

BACKGROUND OF THE INVENTION

Sealing tapes unwound from sealing tape rolls are used to seal joints between a frame profile of a window or door, for example, and the wall of a building in order to seal off the joints against drafts and driving rain. Such sealing tapes are usually wound up into sealing tape rolls under compression for space-saving storage, for transport, and for easier handling during installation. In addition to the low permeability to air and the sealing property against driving rain, the resistance of the sealing tape to the diffusion of water vapor is considered one of the more especially important properties of a sealing tape. Additionally provided barrier layers on a side surface of the sealing tape or in its interior, parallel to a side surface, of the sealing tape increase the impermeability of the sealing tape to water vapor between the interior and the exterior of a room. The water vapor diffusion resistance of such a barrier layer is higher than that of the foam of the sealing tape and is therefore capable of reducing the diffusion of water vapor through the sealing tape. A sealing tape with interior barrier layers is known from US 2016/0059536 A1, for example.

When a sealing tape of this type is inserted into a joint between a frame element and a masonry wall, its bottom surface rests on the frame element and an opposite surface, i.e., the top surface, rests on the section of wall facing the joint. The barrier layer on or in the sealing tape extends over the entire cross section of the joint from the frame element to the wall. As a result, an edge of the barrier layer adjacent to the top surface of the sealing tape runs along the masonry wall. As a result of the installation work during the placement of doors or windows, the masonry wall usually has a rough to very uneven surface. The sealing tape, which is made of flexible foam, thanks to its flexibility, can conform to these irregularities. The at least one barrier layer, however, is relatively stiff, and in particular the edge of the barrier layer adjacent to the section of wall cannot usually conform completely to the profile of the wall section. In such areas, therefore, gaps are formed between the masonry wall and the at least one barrier layer; these gaps allow the water vapor to bypass the barrier layer and thus diffuse with essentially no hindrance. As a result, the impermeability of the sealing tape to water vapor is negatively affected, and/or, in the installed state of the sealing tape, in which it is fitted between the frame element and the masonry wall, this impermeability has a value which is lower than that of a sealing tape which has been able to make contact over its entire surface.

SUMMARY OF THE INVENTION

It is an object of the present invention to provide a sealing tape and a method for producing a sealing tape which make it possible to improve the sealing properties of the sealing tape.

According to an aspect of the invention, a method for producing a sealing tape roll including the steps of: (1) a foam-barrier layer web, which comprises a plurality of foam strips arranged next to each other in a transverse direction and at least one barrier layer, wherein a barrier layer is arranged between each pair of adjacent foam strips, wherein the foam-barrier layer web has a top surface, a bottom surface, and two side surfaces connecting the top surface and the bottom surface together, and wherein a longitudinal direction is parallel to the bottom surface of the foam-barrier layer web and transverse to the transverse direction; (2) applying a cover layer to the top surface and/or the bottom surface of the foam-barrier layer web to form a coated foam-barrier layer web; (3) parting the cover layer in the longitudinal direction in the area of at least two foam strips and a certain distance away from each of the barrier layers adjacent to these foam strips, thus forming subsections of the cover layer, wherein a subsection of the cover layer at least partially covers at least two foam strips adjacent to each other; and (4) forming a sealing tape roll by winding up the coated foam-barrier layer web around a rotational axis to form a sealing tape roll; or winding up the coated foam-barrier layer web around a rotational axis to form an intermediate roll and parting the intermediate roll at one or more points in the axial direction to produce a plurality of sealing tape rolls, which are narrower than the intermediate roll; or parting the coated foam-barrier layer web in the longitudinal direction to form foam-barrier layer strips and winding up the foam-barrier layer strips around a rotational axis to form individual sealing tape rolls.

In this way, a sealing tape wound up into a sealing tape roll is provided, which comprises subsections of a cover layer on the top and/or bottom surface, which are oriented transversely to the at least one interior barrier layer and cover it. At least in a final installation state of the sealing tape, in which the tape has been inserted into a joint between a frame element and a section of masonry wall, the at least one interior barrier layer is directly adjacent to the subsection of the cover layer which covers it, so that there is essentially no possibility that water vapor can diffuse between the barrier layer and the subsection of the cover layer. The subsection of the cover layer in question in turn rests flat on the section of the masonry wall, as a result of which the contact area is increased in comparison to the situation in which only an edge of the barrier layer rests against the wall section. In this two-dimensional configuration, the subsection of the cover layer is more flexible than the barrier layer arranged perpendicular to it and can therefore conform more effectively to uneven parts of the wall section. Because of the two-dimensional contact between a subsection of the cover layer and the wall section, furthermore, the contact area is increased, which guarantees that at least certain parts of the subsection rest against the wall section even when there are uneven areas to which it cannot completely conform locally.

Sealing tapes extend significantly farther in the longitudinal direction than they do in the transverse direction and are therefore, for the sake of space-saving storage, usually wound up into a sealing tape roll (or intermediate roll) around an axis which is parallel to the transverse direction of the sealing tape or of the foam-barrier layer web.

The skilled person is familiar with various methods for providing a foam-barrier layer web. US 2016/0059536 A1, for example, describes the insertion of barrier layer-forming strips by way of suitably adapted insertion tools into cuts, which have been previously made in a foam web. According to EP 2 990 552 A1 and US 2016/0060068 A1, individual foam strips can be provided, at least one of which comprises a side surface onto which a barrier layer material has been applied. The foam strips are brought together and bonded to each other in such a way that the barrier layer material is accommodated between two adjacent foam strips. Alternatively, US 2013/0187348 A1 discloses the introduction of at least one cut into a foam web which does not pass completely through the web, and a V-shaped film is than inserted into this cut. Other methods are known, any of which can readily be used here.

In comparison to the foam strip of flexible foam, however, the cover layer is also relatively stiff. The flexible foam of the foam strips is more flexible than the cover layer and can thus conform more effectively to the profile of the section of masonry wall. To guarantee the best possible contact between the sealing tape and the wall section, the cover layer is therefore divided into subsections. This achieves the goal that, between the subsections of the cover layer, the conformity of this layer to the wall profile can be improved. A cover layer which extends over the entire top surface and/or bottom surface of the sealing tape would be too inflexible to ensure that this layer can rest against the wall section over the entire width of the sealing tape.

The foam-barrier layer web is wound up into the sealing tape roll or intermediate roll in such a way that the subsections of the cover layer are accommodated two-dimensionally between the individual turns of the roll in question. If the subsections of the cover layer are arranged on the top surface of the foam-barrier layer web, the subsections of one turn are adjacent to the bottom surface of an adjacent turn. In a corresponding manner, when the subsections are arranged on the bottom surface of the foam-barrier layer web, the subsections of one turn are adjacent to the top surface of an adjacent turn. The same also applies to sealing tape rolls which are formed by the winding-up of foam-barrier layer strips.

The parting of the cover layer in the longitudinal direction is preferably done in the area of each foam strip of the plurality of foam strips. As a result, each of the subsections which is formed covers a barrier layer, whereas the sealing tape has sufficient flexibility in the area of each foam strip to conform to the profile of the masonry wall.

It is preferred that the parting of the cover layer be done in the central area of the foam strip in question, as a result of which a symmetrical structure of the sealing tape and thus the most uniform possible sealing properties are obtained. The central area is located symmetrically between the side surfaces of the foam strip in question, wherein the side surfaces of the foam strip are parallel to the side surfaces of the foam-barrier layer web.

It is especially preferred that the subsections of the cover layer form strips, which are arranged next to each other in the transverse direction and which are parallel to each other in the longitudinal direction. The subsections are preferably uniformly distributed in the transverse direction; they therefore are spaced equally apart from each other. In addition, because of the way in which the configuration of the cover layer is defined, the uniformity of the sealing properties is guaranteed. The goal is also achieved that, with a precisely defined arrangement and geometry of the individual components of the sealing tape, the manufacturing process and the properties of the sealing tape are reproducible, and the sealing properties in the installed state differ as little as possible from the theoretically determined nominal values.

In one embodiment, the foam-barrier layer web comprises a plurality of barrier layers, and a subsection of the cover layer at least partially covers at least three adjacent foam strips. If a corresponding number of foam strips and barrier layers is present, additional subsections can also be provided, which at least partially cover at least three adjacent foam strips. A subsection of this type partially covers the two outermost foam strips, i.e. outermost with respect to the transverse direction, and completely covers the foam strip or foam strips present between these two outermost foam strips. In this embodiment, a subsection of this type covers at least two barrier layers. As a result, the manufacturing method is simplified and can be conducted with reliable results, because there are fewer points at which the cover layer must be parted. Nevertheless, it is still possible for the sealing tape to have sufficient flexibility.

In a preferred embodiment, the parting of the cover layer comprises the introduction of at least one cut into the cover layer. The introduction of a cut can be carried out by a suitable adapted tool such as cutting edges, knives, saws, or the like. The coated foam-barrier layer web is moved in the longitudinal direction relative to these tools. The tools, seen in the longitudinal direction, are preferably arranged in a fixed position, and the foam-barrier layer web is moved longitudinally along the tools. It is also conceivable, however, that, additionally or alternatively, the tools could be moved in the longitudinal direction.

The at least one cut can pass through only the cover layer, without damaging the foam strip underneath. Because the cover layer can be very thin, however, and because such a shallow cut is very difficult to monitor and control, the at least one cut can pass through the cover layer and also penetrate into the associated foam strip. In any case, it must be ensured that the cohesion of the foam-barrier layer web in the transverse direction is not negatively affected by the penetration of the cut into the foam. The depth of the at least one cut in the foam strip is therefore maximally ⅓, preferably maximally ⅕, and even more preferably maximally 1/10 of the thickness of the foam strip between the top surface and the bottom surface of the foam-barrier layer web. Ideally, the depth of the at least one cut in the foam strip in question is not more than 1 mm or 5 mm. In no case may the at least one cut pass completely through the associated foam strip. The depth of the at least one cut in the foam must also be kept as shallow as possible so that the sealing properties of the sealing tape are not negatively affected.

As an alternative to the introduction of at least one cut, the parting of the cover layer can, in an especially preferred embodiment, comprise the removal of certain areas of the cover layer between the subsections of the cover layer to be formed. The removal of the cover layer in certain areas can comprise the melting of the cover layer, the milling-away of the cover layer, or the cutting and removal of the certain areas of the cover layer. Alternative possibilities for removing the cover layer are conceivable and will be obvious to the skilled person. As a result of the removal of certain areas of the cover layer, the associated foam strip is exposed between the subsections of the cover layer. In the area between the subsections of the cover layer, the foam, in the installed state, can therefore conform optimally to the surface of the section of the masonry wall. In the area of the barrier layers, however, the subsections of the cover layer remain in place to increase the contact area with the wall section.

The cover layer can be removed in certain areas in such a way that the foam underneath is not damaged. Because the thinness of the cover layer makes the method more difficult, however, it is also conceivable that a small amount of foam could be removed in this area from the foam strip in question. The removal of the cover layer, however, also extends across a certain width. It is therefore especially important in this case not to penetrate too deeply into the associated foam strip so as not to exert too much of a negative influence on the sealing properties of the sealing tape. Therefore, a maximum of ⅓, preferably a maximum of ⅕, more preferably a maximum of ¹⁄₁₀, and even more preferably a maximum of ¹⁄₂₀ of the thickness of the foam strip between the top surface and the bottom surface of the foam-barrier layer web is removed.

If the removal in certain areas is achieved by cutting the cover layer and removing certain areas of it, the cuts will be introduced as previously described. Instead of the introduction of at least one cut into the cover layer, two cuts will be introduced in each case into the cover layer in the area of a foam strip in the longitudinal direction, wherein the area between these two cuts is then removed. If the cover layer, at the time of the removal, has not yet been bonded to the foam strip, the strip of the cover layer to be removed is easy to lift off. If the cover layer has been detachably bonded to the associated foam strip at this time, the area to be removed can be pulled off. It is also possible, however, that the cover layer has already been permanently bonded to the associated foam strip. In this case, a small amount of foam will also have to be removed. For example, the area of the cover layer to be removed is raised, and a rotating or reciprocating knife can sever the bond between the cover layer and the foam strip underneath the area of the cover layer to be removed.

To obtain the best possible ratio between exposed foam, which conforms optimally to the surface of the masonry wall, and the subsections of the cover layer, it is preferred that a ratio in the range of 1:10-1:2 be set between the width of the subsections and the width of the foam sections. The width of the subsections of the cover layer is preferably in the range of 1-40 mm, preferably 2-35 mm, even more preferably 5-30 mm; and the width of the areas of exposed foam is preferably in the range of 0.1-60 mm, more preferably 1-50 mm, and especially preferably 5-30 mm.

The method prior to the parting of the cover layer preferably comprises the bonding of the cover layer to the foam strips of the foam-barrier layer web. The cover layer is thus permanently attached to the foam-barrier layer web and held in position and cannot be unintentionally shifted or damaged during the following step of parting the cover layer.

When the cover layer is bonded to the foam strips of the foam-barrier layer web, the cover layer is also preferably bonded to the at least one barrier layer. The bonding of the cover layer to the at least one barrier layer achieves the result that even the area in which the barrier layer is adjacent to or butts up against the associated subsection of the cover layer acquires the desired impermeability to water vapor. The butt joint between barrier layer and subsection of the cover layer is thus sealed, and there is no gap between the barrier layer and the subsection of the cover layer through which water vapor could diffuse.

Alternatively, the method comprises the bonding of the at least one subsection of the cover layer to the at least one barrier layer arranged in the area of the subsection. The bonding therefore occurs only after the cover layer has been parted to form the subsections. For example, the bonding of the subsections of the cover layer to the associated barrier layers occurs during the compression of the foam-barrier layer web when this web is being wound up into the sealing tape roll or the intermediate roll. The method can therefore be configured flexibly.

The at least one barrier layer preferably extends from the top surface to the bottom surface through the entire foam-barrier layer web. As a result, the impermeability to water vapor can be made uniform over the entire cross section of the sealing tape. Alternatively, the at least one barrier layer can also extend over only part of the distance between the top surface and the bottom surface of the foam-barrier layer web. The at least one barrier layer preferably extends between the top surface and the bottom surface of the foam-barrier layer web over at least 50% of the thickness, more preferably over at least 75% of the thickness, and even more preferably over at least 90% of the thickness of the foam-barrier layer web.

The cover layer can be made of the same material as the at least one barrier layer. The cover layer, however, can also be made of a material different from that of the at least one barrier layer. The cover layer is especially preferably made of a film-like material or of an adhesive, especially a film web, a film strip, an adhesive tape strip, or an adhesive-like fluid medium. These materials are especially well adapted to the realization of the sealing requirements and to the application and bonding to the foam of the foam strips.

For example, the barrier layers and/or the cover layer described herein are made of a film-like material such a film of polyamide, polyurethane, polypropylene, or copolymers thereof. The barrier layers and cover layers described herein can also consist of an adhesive, e.g., a dispersion adhesive, especially an acrylate adhesive. If several barrier layers are provided, these can consist of the same material or of different materials.

The barrier layers and also the cover layers can be configured with "humidity variability"; that is, their resistance to the diffusion of water vapor changes as a function of the atmospheric humidity of the environment. Characteristic of the water vapor diffusion resistance is the water vapor diffusion value relative to the thickness in meters of a layer of air, the so-called sD value.

A layer preferably has an sD value in the range of 0.05-100 m, more preferably of 0.1-25 m or of 0.2-15 m (at 25% relative humidity (RH)). The sD value is tested according to DIN EN ISO 12572:2001. Independently or in combination, a layer can have an sD value in the range of 0.02-10 m or of 0.03-6 m or of 0.05-2 m at 72.5% RH, determined according to DIN EN ISO 12572:2001. For example, the sD value at 25% RH can be in the range of 1-10 m, and the value at 72.5% RH can be in the range of 0.1-5 m. Unless otherwise stated in DIN EN ISO 12572:2001, the sD values are all based on a temperature of 20° C.

The barrier layers and/or the cover layer preferably consist at least partially of a synthetic, water-swellable polymer.

Both a barrier layer and a cover layer have a thickness in the range between 1 μm and 1 mm, preferably a thickness in the range of 1-500 μm or of 2-250 μm, especially preferably in the range of 5-100 μm or 5-50 μm.

The barrier layers can also consist of multiple plies; in particular they can be configured as a multi-ply composite layer. At least one layer of at least one other material can be arranged on one or both sides of the functional layer. The one or two additional layers, each of which can cover the functional layer either partially or completely, can protect it and carry or support it and increase the stability of the barrier layers. The individual layers can consist of the same or different materials.

The layers on one or both sides can in particular be nonwoven material, fabric, or mesh of inert substances such a polyethylene, polyurethane, polypropylene, polyester, glass fibers, or viscose, possibly even perforated films, especially those made of polyethylene, polyurethane, polypropylene, or polyester. The layers can generally consist of any suitable material which is present in the form of layers and the sD value of which is preferably not higher than that of the functional layer. The layers on one or both sides can consist of a dispersion adhesive, especially an acrylate adhesive.

The air permeability of the barrier layers or barrier plies and of the cover layer is preferably in the range of 0.01-50 l/(m²s), more preferably in the range of 0.01-20 l/(m²s). The air permeability is preferably ≤3-6 l/(m²s) or preferably ≤1-2 l/(m²s) or ≤0.2-0.5 l/(m²s) or especially preferably ≤0.01-0.3 l/(m²s) according to DIN EN ISO 9237 for a test area of 100 cm² at a measurement pressure (negative pressure) of 1.0 mbar as tested by a Frank model 21443 test unit or is not measurable.

The foam of the sealing tape can be made of any desired open-cell or closed-cell flexible foam such as a foam of polyurethane, polyethylene, polyvinyl chloride, or polypropylene, and it can be impregnated to delay its recovery after compression. The density of such flexible foams is in the range of 20-200 kg/m³.

The individual foam strips of the foam-barrier layer web preferably all consist of the same material. Alternatively, the foam strips can be made out of different materials.

The flexible foam preferably has a compression hardness of more than 2 kPa. The compression hardness is preferably more than 2.1 kPa, more preferably more than 2.2 kPa, especially preferably more than 2.3 kPa. The compression hardness is preferably less than 4 kPa, preferably less than 3.8 kPa, and more preferably less than 3.6 kPa. The compression hardness is a measure of the strength of the foam. The values given here are based on a compression of 40% versus the original thickness. The compression hardness is determined according to DIN EN ISO 3386; the CV40 value is indicated.

The foam-barrier layer web is preferably at least partially and preferably completely impregnated with an impregnation agent to delay the recovery of the sealing tapes. The impregnation agent preferably comprises an acrylate dispersion. In an advantageous embodiment, the acrylate dispersion comprises acrylate polymer particles dispersed in a homogeneous phase. The foam is especially preferably impregnated with a weight-percentage of a recovery-delaying acrylate dispersion such that the sealing tape, at 20° C. and 50% relative humidity, recovers to the point at which it seals the joint from a compression of approximately 9-13% in less than 24 hours.

A foam impregnated for the purpose of delayed recovery preferably has a permeability to air in the range of 50-1,000 l/(m²s), more preferably of 60-600 l/(m²s), and especially preferably of 80-400 l/(m²s). The data on air permeability stated in this application pertain to a determination under standard conditions of a 10-mm-thick foam piece (completely relaxed) at a negative measurement pressure of 1.0 bar (test area, 100 cm², Frank model 21443 testing machine, DIN ISO 9237).

A sealing tape according to an aspect of the invention comprises a top surface, a bottom surface, and two side surfaces connecting the top and bottom surfaces together; it also has a longitudinal direction, which is parallel to the bottom surface of the sealing tape. The sealing tape comprises a plurality of foam strips arranged next to each other in a transverse direction, wherein the transverse direction is parallel to the bottom surface of the sealing tape and transverse to the longitudinal direction of the sealing tape, and at least two barrier layers, wherein a barrier layer is arranged between each pair of adjacent foam strips. The sealing tape also comprises at least one continuous subsection of a cover layer on the top and/or bottom surface of the sealing tape, which partially covers two adjacent foam strips and which is bonded to these two foam strips.

Thus a sealing tape is provided, which comprises at least one subsection of a cover layer on the top and/or bottom surface, which cover layer is oriented transversely to the at least one interior barrier layer and covers it. At least in an installed state of the sealing tape, in which the tape has been inserted into a joint between a frame element and a section of masonry wall, the at least one interior barrier layer is directly adjacent to the subsection of the cover layer covering it, so that essentially no water vapor can diffuse unhindered between the barrier layer and the subsection of the cover layer. The subsection of the cover layer in turn rests flat against the section of masonry wall, as a result of which the contact area is increased in comparison to the case in which only an edge of the barrier layer rests against the wall section. In this two-dimensional configuration, the subsection of the cover layer is more flexible than a barrier layer arranged perpendicular to it, and it thus conform more effectively to the uneven parts of the wall section. Because of the two-dimensional contact between the subsection of the cover layer and the wall section, furthermore, the contact area is increased, which guarantees that at least certain areas of the subsection rest against the section of masonry wall even in when there are uneven parts to which it cannot completely conform locally.

Finally, it is preferred that the at least one subsection of the cover layer be bonded to the barrier layer which is arranged in the area of the subsection. This prevents the formation of a gap between the barrier layer and the subsection of the cover layer, through which water vapor could diffuse unhindered.

DETAILED DESCRIPTION OF SPECIFIC EMBODIMENTS

Figure 1:
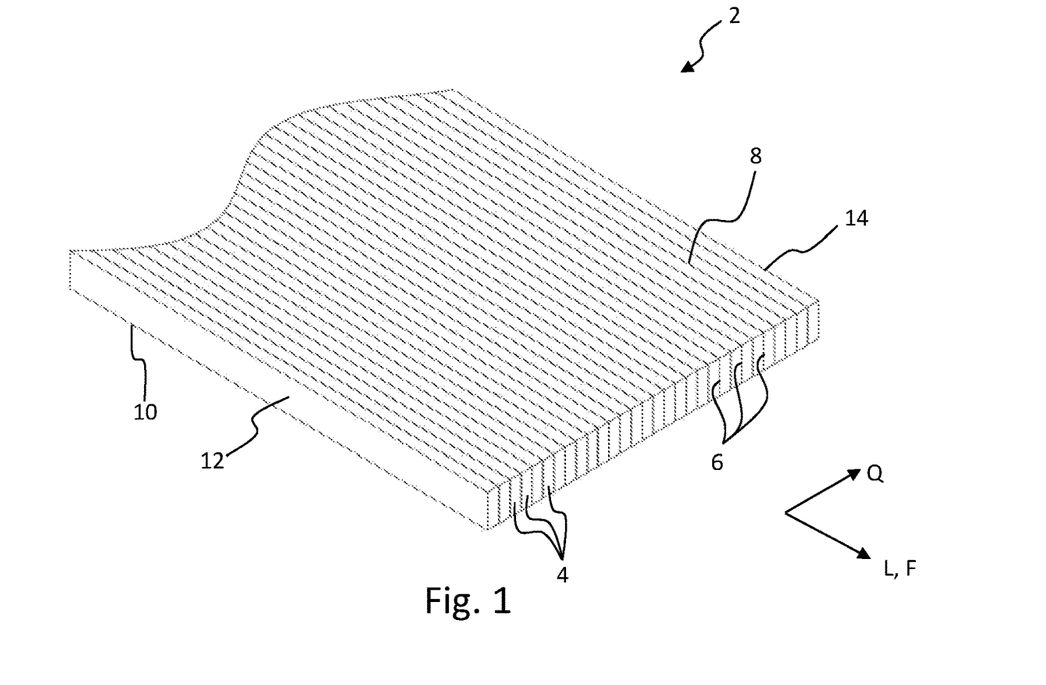
FIG. 1 shows a perspective view of the step of providing a foam-barrier layer web according to a method of the invention.

FIG. 1 shows an isometric view of the step of providing a foam-barrier layer web 2. The foam-barrier layer web 2 comprises a plurality of foam strips 4, which are arranged next to each other in a transverse direction Q. Foam-barrier layer web 2 also comprises at least one barrier layer 6, wherein barrier layer 6 is arranged between each pair of adjacent foam strips 4. Each barrier layer 6 is preferably bonded to both of foam strips 4 adjacent to it; it can be adhered or laminated to them, for example. Essentially any number of foam strips 4 and barrier layers 6 comprising foam-barrier layer web 2 can be selected. If a large number of foam strips 4 and barrier layers 6 is selected, a plurality of sealing tape rolls can be obtained simultaneously from foam-barrier layer web 2. The larger the number of sealing tape rolls which can be produced at once, the more effective the method.

Foam-barrier layer web 2 comprises a top surface 8, a bottom surface 10, and two side surfaces 12, 14 connecting top surface 8 and bottom surface 10 to each other; it also comprises a longitudinal direction L, which is parallel to bottom surface 10 of foam-barrier layer web 2 and transverse to the transverse direction Q. Foam-barrier layer web 2 and individual foam strips 4 preferably comprise a substantially rectangular cross section. In a compressed state of the foam, the cross-sectional shape can deviate from this.

The at least one barrier layer 6 can extend continuously from bottom surface 10 to top surface 8 of the foam-barrier layer web 2, or it can extend over only part of the distance between bottom surface 10 and top surface 8. To bring about the desired sealing action against the diffusion of water vapor, however, at least one barrier layer 6 extends over at least 500%, preferably over at least 75%, and even more preferably over at least 90% of the thickness of foam-barrier layer web 2.

Foam-barrier layer web 2 is moved in a conveying direction F, which is parallel to the longitudinal direction L of foam-barrier layer web 2.

The foam strips 4 preferably all have the same width in the transverse direction Q and the same height in the thickness direction perpendicular to both the transverse direction Q and the longitudinal direction L. The foam strips 4 can also have different widths and/or different heights so that, for example, a profiled foam-barrier layer web can be formed. As an option, a barrier layer 6 can also be arranged on the side surfaces (forming the side surfaces 12, 14) of the outermost foam strips 4 of the foam-barrier layer web 2.

The skilled person is familiar with a number of different methods for providing a foam-barrier layer web 2. US 2016/0059536 A1, for example, describes the insertion of a barrier layer 6-forming strip by a suitable insertion tool into the cuts, which have previously been made in a foam web. According to EP 2 990 552 A1 and US 2016/0060068 A1, individual foam strips can be provided, at least one of which has a side surface onto which a barrier layer material has been applied. The foam strips are then brought together and bonded in such a way that the barrier layer material is arranged between two adjacent foam strips. Alternatively, US 2013/0187348 A1, for example, discloses that a cut is introduced into a foam web which does not pass completely through the web, and that a V-shaped film is then inserted into this cut. Alternative methods can be used without further ado.

Figure 2:
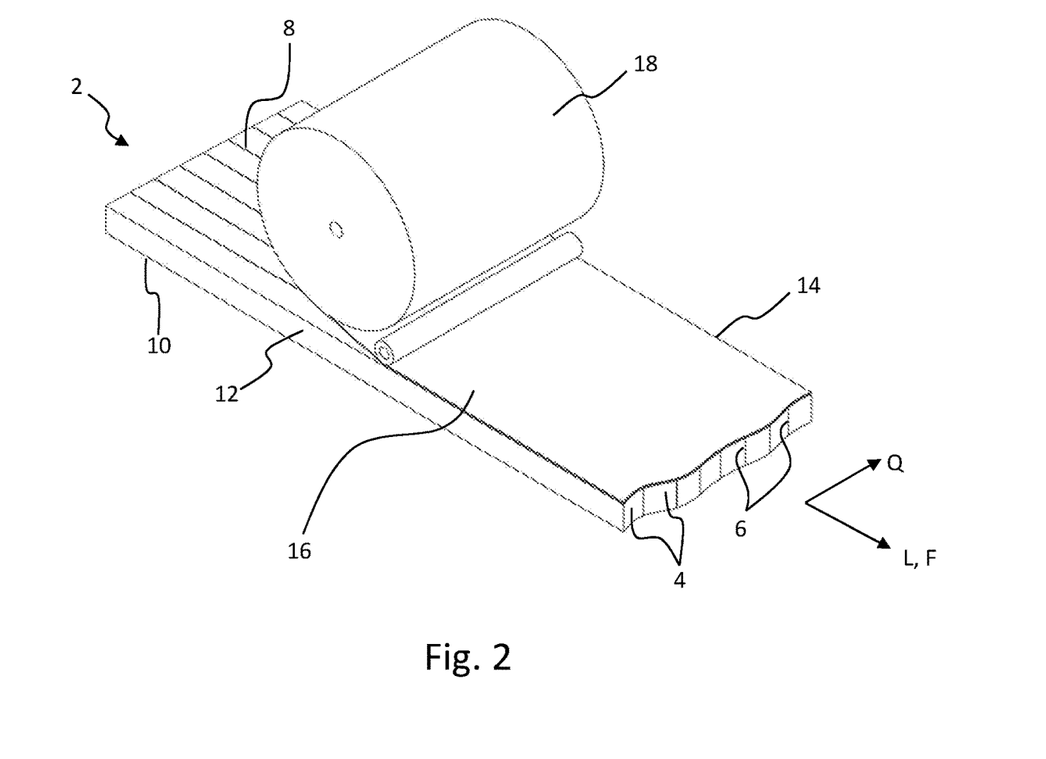
FIG. 2 shows a perspective view of the step of applying a cover layer to the foam-barrier layer web of FIG. 1.

FIG. 2 shows an isometric view of the application of a cover layer 16 to the foam-barrier layer web 2 according to FIG. 1. In the preferred embodiment shown, the cover layer 16 is configured as a film web. The cover layer 16 is provided on a supply roll 18 and is fed to the top surface 8 of the foam-barrier layer web 2. Similarly, the cover layer or an additional cover layer can also be fed to the bottom surface 10 of the foam-barrier layer web 2. Accordingly, the cover layer 16 can be applied to the top surface 8, to the bottom surface 10, or to both the top surface 8 and the bottom surface 10 of the foam-barrier layer web 2.

The following description of preferred embodiments refers primarily to a cover layer 16 on the top surface 8 of the foam-barrier layer web 2. It is obvious that the explanations are applicable in analogous fashion to embodiments in which, additionally or alternatively, a cover layer 16 is provided on the bottom surface 10 of the foam-barrier layer web 2. Corresponding features can be combined in any way desired.

Alternatively, the cover layer can consist of an adhesive-like fluid medium, which is applied in the known manner to the top surface 8 and/or bottom surface 10 of foam-barrier layer web 2 by appropriate nozzles, for example.

Independently of the material and of the manner in which cover layer 16 is applied, cover layer 16 preferably covers the entire surface 8, 10 of foam-barrier layer web 2 to which it is applied. It is preferred that cover layer 16 be bonded to the foam strips 4 when it is applied to foam-barrier layer web 2. Cover layer 16 can also be bonded immediately to barrier layers 6. For example, the cover layer 16 can be adhered to foam-barrier layer web 2. For this purpose, cover layer 16 either is provided with an additional adhesive or is configured as an adhesive tape or has itself a certain adhesive property. A film-like cover layer 16 can also be laminated onto foam-barrier layer web 2, wherein the bonding occurs under the action of heat and pressure. Alternative methods for applying a cover layer 16 of the type cited above are known to the skilled person and can be used without further ado.

As previously described, foam-barrier layer web 2 and cover layer 16 continue to move in the conveying direction F during the application of cover layer 16.

Figure 3:
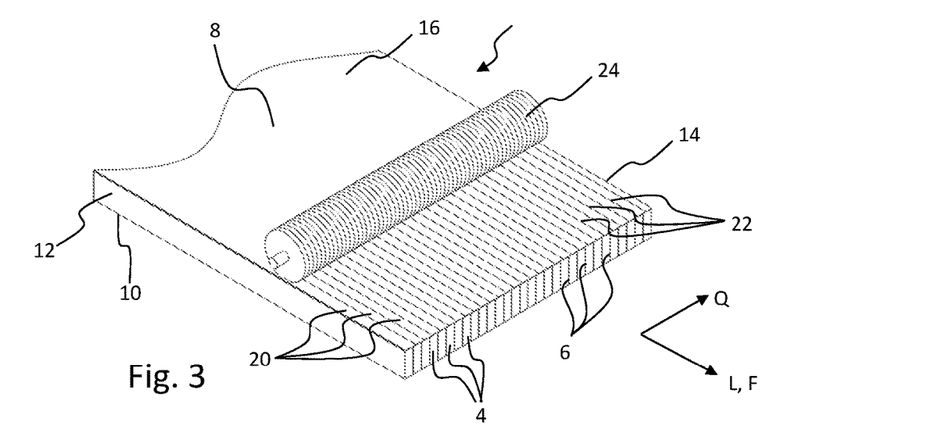
FIG. 3 shows a perspective view of the step of parting the cover layer according to a first embodiment.
Figure 4:
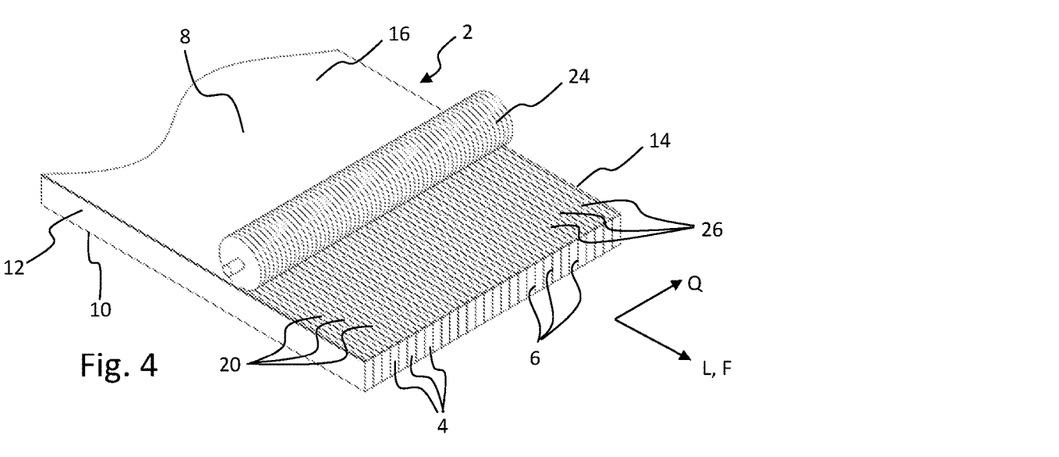
FIG. 4 shows a perspective view of the step of parting the cover layer according to an alternative, second embodiment.
Figure 5:
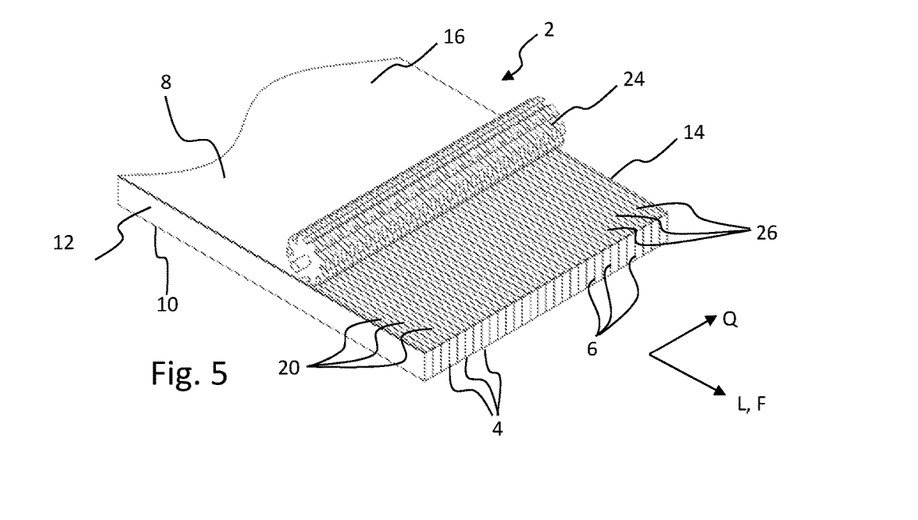
FIG. 5 shows a perspective view of the step of parting the cover layer according to an alternative, third embodiment.

FIGS. 3-5 show isometric views of various embodiments of the step of parting cover layer 16. Cover layer 16 is parted in the longitudinal direction L in the area of at least two foam strips 4 and a certain distance away from each of barrier layers 6 adjacent to these foam strips 4. That is, cover layer 16 is parted in each case in an area between the two side surfaces of a foam strip 4, wherein the side surfaces of each foam strip 4 are parallel to side surfaces 12, 14 of foam-barrier layer web 2.

As a result of the parting of cover layer 16 in the longitudinal direction L, subsections 20 of cover layer 16 are formed, wherein a subsection 20 of cover layer 16 at least partially covers at least two adjacent foam strips 4. In the illustrated embodiment according to FIGS. 3-5, a subsection 20 partially covers exactly two adjacent foam strips 4. A subsection 20 of cover layer 16 therefore covers in each case a barrier layer 6 arranged inside foam-barrier layer web 2 between these two foam strips 4. Because cover layer 16 is parted in each case in the area of a foam strip 4, the edges of a subsection 20 of cover layer 16 extending in the longitudinal direction L lie in each case between two adjacent barrier layers 6 and a certain distance away from each of them.

The parting of cover layer 16 in the longitudinal direction L can generally be accomplished by introducing at least one cut into cover layer 16 (FIG. 3) or by removing certain areas of cover layer 16 (FIGS. 4 and 5).

FIG. 3 shows an embodiment in which the parting of cover layer 16 in the longitudinal direction L comprises the introduction of at least one cut 22 into cover layer 16. Cover layer 16 is preferably cut through longitudinally in the area of each foam strip 4 of the plurality of foam strips 4. The number of cuts 22 then corresponds to the number of foam strips 4. It is also conceivable that the number of cuts 22 could be less than the number of foam strips 4, as can be derived in particular from the following description of preferred embodiments of a sealing tape according to the invention.

To introduce the at least one cut 22 into cover layer 16, a tool 24 is provided, which cuts through cover layer 16. In the embodiment shown, tool 24 is configured as a roller and comprises a plurality of circumferential cutting edges. Alternatively, other types of tools such as knives or saws can be used.

Cuts 22 are parallel to each other, so that subsections 20 of cover layer 16 which are formed are also parallel. Subsections 20 of cover layer 16 are thus, configured in the form of strips. It is preferred that the at least one cut 22 be introduced only into cover layer 16 without damaging the foam of foam strip 4. Because this requires a high degree of precision, however, it can also be desirable for the at least one cut 22 to be introduced into cover layer 16 and to penetrate into the associated foam strip 4. This makes it easier to carry out the method.

To preserve the integrity of foam-barrier layer web 2 in the transverse direction Q, however, and to avoid any negative influence on the sealing properties of the sealing tapes to be produced, the depth of each cut 22 into foam strip 4 should be small as possible. The depth of each cut 22 in foam strip 4 is therefore a maximum of ⅕, preferably a maximum of ⅒, and more preferably a maximum of 1/20 of the thickness of the foam strip 4 between the top surface 8 and bottom surface 10 of foam-barrier layer web 2. It is especially preferred that each cut 22 not penetrate into the associated foam strip 4 any deeper than 1-2 mm.

As FIG. 3 illustrates, top surface 8 of foam-barrier layer web 2 is covered substantially completely by cover layer 16 even after the introduction of the at least one cut 22. In spite of this, cuts 22 make it possible for cover layer 16 not to have any influence on the flexibility or recovery capacity of foam strips 4 over the entire width in the transverse direction Q. Instead, it is possible for the sealing tape to have a certain flexibility between the individual sections and thus to conform more effectively to the surface of a section of masonry wall.

So that the advantages of the flexibility of the foam used for foam strips 4 can be exploited in optimal fashion, however, it is preferred that the parting of cover layer 16 comprise the removal of certain areas of cover layer 16 between subsections 20 of cover layer 16 to be formed, as shown in FIGS. 4 and 5. In these embodiments, areas 26 of the previously applied cover layer 16 are removed by the selected tool 24. In areas 26, in which cover layer 16 has been removed, the foam of foam strip 4 is exposed. After the sealing tape to be produced has been installed, this makes it possible for the surface of the sealing tape to conform in the areas 26 even to small irregularities of the masonry wall section. In this case as well, subsections 20 form parallel strips extending in the longitudinal direction L.

The width of subsections 20 of cover layer 16 and of areas 26 in the transverse direction Q can basically be selected in any way desired. It is obvious that the width of subsections 20 and the width of the areas 26 influence each other. The wider the subsections 20 of the cover layer, the narrower the areas 26, in which cover layer 16 has been removed, and vice versa. The sealing tapes to be produced are thus adaptable to the existing requirements or to the desired properties.

It is also advantageous in this embodiment for only the cover layer 16 to be removed in certain areas. Because this increases the complexity of the method, however, it is also conceivable that a very small amount of the foam of the associated foam strip 4 could also be removed in the areas 26 next to the cover layer 16. The depth of the intrusion into the foam, however, should not be greater than that previously described in reference to the at least one cut 22.

In the embodiment according to FIG. 4, the tool 24 again comprises circumferential cutting edges, wherein the cutting edges of each pair are arranged a certain distance apart, which distance corresponds to the width of the areas 26 in the transverse direction Q. As a result, a cut into the cover layer 16 extending in the longitudinal direction L is introduced on either side of each area 26, from which the cover layer 16 is to be removed. Then the cover layer arranged in this area 26 can be taken away. If the cover layer 16 is arranged only loosely on the foam-barrier layer web 2 or is detachably attached to it, the cover layer 16 can simply be lifted off or pulled off. If the cover layer 16 has been permanently bonded to the foam-barrier layer web 2, it may be necessary to use an additional cutting tool to separate the cover layer 16 from the foam of the foam strip 4 situated underneath in the areas 26.

The tool 24 according to FIG. 4 can also have a surface profile, wherein, for example, circumferential projections are formed on the lateral surface of the tool 24, the width of which corresponds to the width of the areas 26. At least these projections can be heated, so that the cover film 16 can be melted in the areas 26 and thus removed. The contours of the subsections 20 of the cover layer 16 are then usually irregular, and the subsections 20 do not necessarily form parallel strips. The cover layer can also be melted by other heat sources such as by lasers and thus, removed.

The skilled person will readily envision alternative tools for introducing cuts or for melting the cover layer 16 in the areas 26.

FIG. 5 shows an embodiment of tool 24, which is adapted to the milling-off of the cover layer in areas 26. Tool 24 is again configured essentially as a roller and comprises a plurality of cutting edges, which are distributed around the circumference, which cutting edges are separated from each other by a distance which corresponds to that between areas 26. Here again, alternative types of tools 24 can be readily envisioned.

Figure 6:
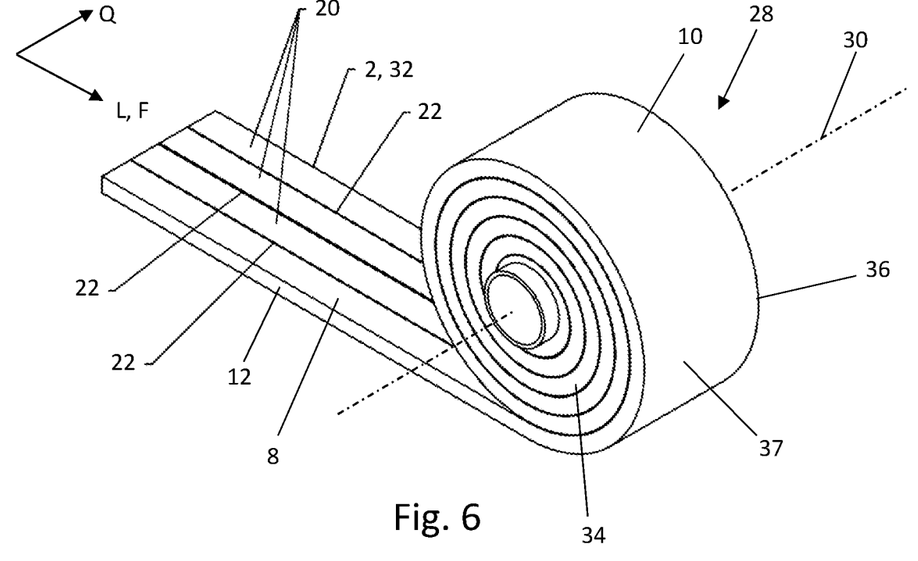
FIG. 6 shows a perspective view of the step of forming a sealing tape roll by winding up the coated foam-barrier layer web.

FIG. 6 shows an isometric view of the step of forming a sealing tape roll 28 according to a first alternative by winding up the coated foam-barrier layer web 2 around a rotational axis 30 into a sealing tape roll 28. This first alternative of the formation of a sealing tape roll 28 is advantageous especially in cases where the width of foam-barrier layer web 2 in the transverse direction Q already corresponds to the width of sealing tape 32 to be produced. Foam-barrier layer web 2 therefore already comprises the number of foam strips 4 and barrier layers 6 which the sealing tape 32 to be produced is intended to have. Coated foam-barrier layer web 2 must then merely be wound up around rotational axis 30, which is parallel to the transverse direction Q, into sealing tape roll 28. The method for producing a sealing tape roll 28 is thus very simple.

During the winding-up process, foam-barrier layer web 2 or sealing tape roll 32 is compressed to allow space-saving storage. It is conceivable that the pressure required to bond the cover layer 16 or its subsections 20 to the at least one barrier layer 6 could be applied only at this time.

Foam-barrier layer web 2 or sealing tape 32 is wound up in such a way that the subsections 20 of cover layer 16 of one turn of sealing tape roll 28 rest flat against the bottom surface 10 of foam-barrier layer web 2 or of sealing tape 32 of the adjacent turn. Side surfaces 12, 14 of foam-barrier layer web 2 form the end surfaces 34, 36 of sealing tape roll 28.

An adhesive layer 37, furthermore, can be applied to bottom surface 10 of the foam-barrier layer web or of the sealing tape before sealing tape roll 28 is wound up or while it is being wound up. By adhesive layer 37, sealing tape 32 can be easily attached to the frame element. Adhesive layer 37 can be formed by a film-like or viscous adhesive; or it can be, for example, a double-sided adhesive tape. Adhesive layer 37 is preferably covered by a peel-off layer (not shown), which prevents adjacent turns of sealing tape roll 28 from sticking together and the roll from being damaged or soiled. Adhesive layer 37 is to be applied to surface 8, 10 of the foam-barrier layer web which is opposite the surface 8, 10 comprising cover layer 16. It is also conceivable that cover layer 16 itself could fulfill the function of adhesive layer 37.

Figure 7:
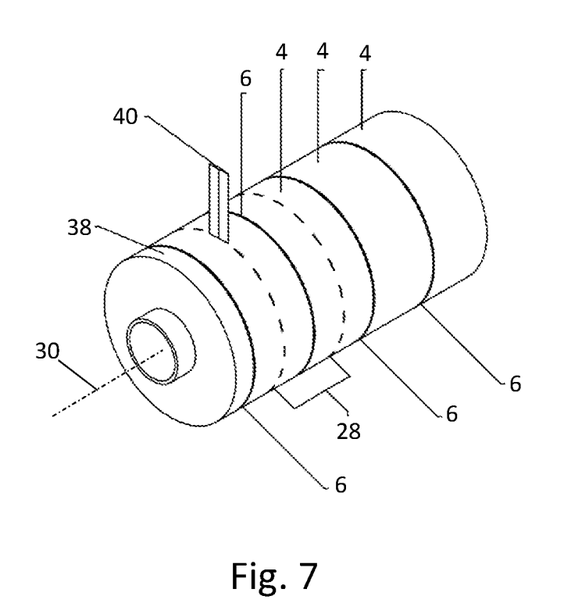
FIG. 7 shows a perspective view of the step of forming a sealing tape roll by winding up the coated foam-barrier layer web into an intermediate roll and parting the intermediate roll to form individual sealing tape rolls.

FIG. 7 shows an isometric view of the forming of a sealing tape roll 28 according to a second embodiment by winding up the coated foam-barrier layer web 2 around a rotational axis 30 into an intermediate roll 38 and by cutting intermediate roll 38 at one or more points in the axial direction to produce a plurality of sealing tape rolls 28, which are narrower than intermediate roll 38. By cutting intermediate roll 38 at one or more points in the axial direction, a plurality of sealing tape rolls 28 can be obtained from one foam-barrier layer web 2. The sealing tape rolls 28 can comprise any desired number of interior barrier layers 6, insofar as the foam-barrier layer web 2 has been appropriately dimensioned and configured. The points at which the intermediate roll 38 is cut are to be selected correspondingly.

Intermediate roll 38 can be cut by a knife 40 or some other suitably adapted tool; for example, it can be cut by saws or by water-jet cutting. As previously mentioned, the foam-barrier layer web 2 is also compressed when it is wound up into the intermediate roll 38. Correspondingly, the bonding of the subsections 20 of cover layer 16 to barrier layers 6 can again be carried out only at this point in time, if desired.

Figure 8:
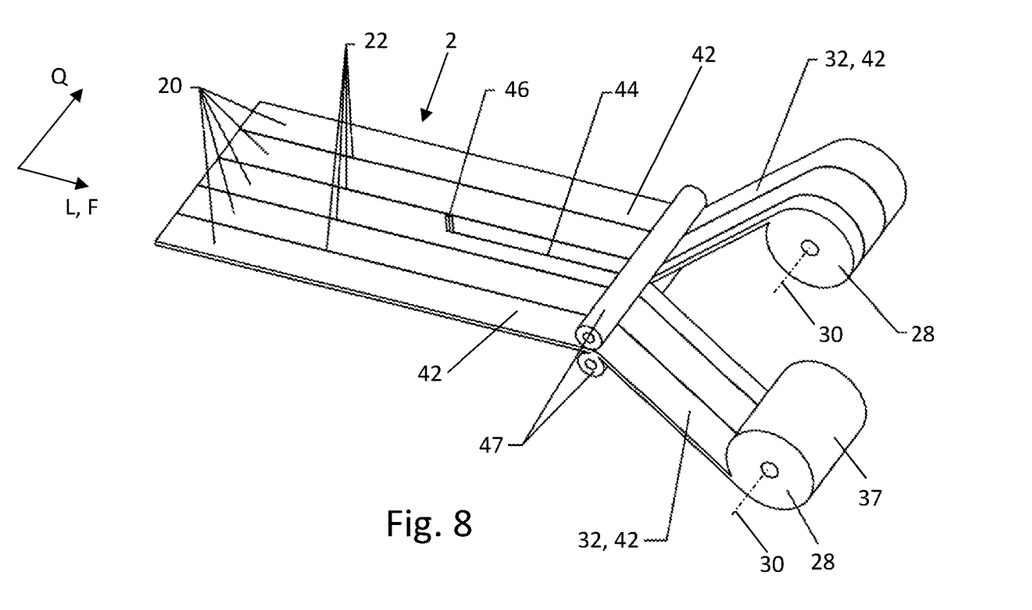
FIG. 8 shows a perspective view of the step of forming a sealing tape roll by cutting the coated foam-barrier layer web into foam-barrier layer strips and winding up these strips into individual sealing tape rolls.

FIG. 8 shows the step of forming a sealing tape roll 28 according to a third embodiment by cutting coated foam-barrier layer web 2 in the longitudinal direction L to form foam-barrier layer strips 42 and by winding up foam-barrier layer strips 42 around a rotational axis 30 into individual sealing tape rolls 28. To cut through the coated foam-barrier layer web 2, at least one cut 44 is introduced into it, which passes all the way through the foam-barrier layer web 2 to form a plurality of foam-barrier layer strips 42 arranged next to each other in the transverse direction Q. Cut 44 is introduced by a knife 46, for example, wherein alternatives such as sawing or water-jet cutting are also conceivable.

In the area of the rollers 47, the foam-barrier layer strips 42 can be compressed, so that each one can then be wound up around a rotational axis 30 into a sealing tape roll 28. The rotational axis 30 is parallel to the transverse direction Q in this case as well. Accordingly, a foam-barrier layer strip 42 corresponds to a sealing tape 32, and the width of each foam-barrier layer strip 42, i.e., the number of foam strips 4 and interior barrier layers 6 it has, is to be selected correspondingly. Here again, an additional adhesive layer 37 can be provided, as discussed above.

FIGS. 9-12 show cross-sectional views of various embodiments of a sealing tape 32 according to the invention. Because the width, i.e., the number foam strips 4 and barrier layers 6, of a sealing tape 32 and of the foam-barrier layer web 2 provided for its production can basically be selected in any desired way, the following discussion of FIGS. 9-12 are applicable in analogous fashion to a foam-barrier layer web 2 according to FIGS. 1-8. The features described with reference to FIGS. 9-12 can therefore be carried over both to the foam-barrier layer web 2 in question here and to each of the other illustrated embodiments of the sealing tape 32. The described features can basically be combined freely with each other. The division into the embodiments according to FIGS. 9-12 serves merely to provide a better understanding, because not all of the features are shown in a single embodiment. Conceivable combinations of the described features will be readily apparent to the skilled person, but every possible combination of features cannot be illustrated individually.

Basically a sealing tape 32 comprises a top surface 48, a bottom surface 50, and two side surfaces 52, 54 which connect the top surface 48 and the bottom surface 50 together. A sealing tape 32 also comprises a longitudinal direction L, which is parallel here to the bottom surface 50 of the sealing tape 32. In FIGS. 9-12, the longitudinal direction L is perpendicular to the plane of the drawing.

The top surface 48 and the bottom surface 50 of the sealing tape 32 correspond to the top surface 8 and the bottom surface 10 of the foam-barrier layer web 2, and the longitudinal direction L of the sealing tape 32 is parallel to the longitudinal direction L of the foam-barrier layer web 2.

Each sealing tape 32 comprises a plurality of foam strips 4 arranged next to each other in the transverse direction Q, wherein the transverse direction Q is parallel to the bottom surface 50 of the sealing tape 32 and transverse to the longitudinal direction L of the sealing tape 32. The sealing tape 32 also comprises at least one barrier layer 6, wherein a barrier layer 6 is arranged between each pair of adjacent foam strips 4. Each sealing tape 32 also comprises at least one continuous subsection 20 of a cover layer 16 on the top surface 48 and/or on the bottom surface 50 of the sealing tape 32, which partially covers two adjacent foam strips 4 and is bonded to the two foam strips 4. The at least one subsection 20 of the cover layer 16 is preferably bonded to the barrier layer 6 which is arranged in the area of the associated subsection 20.

Figure 9:
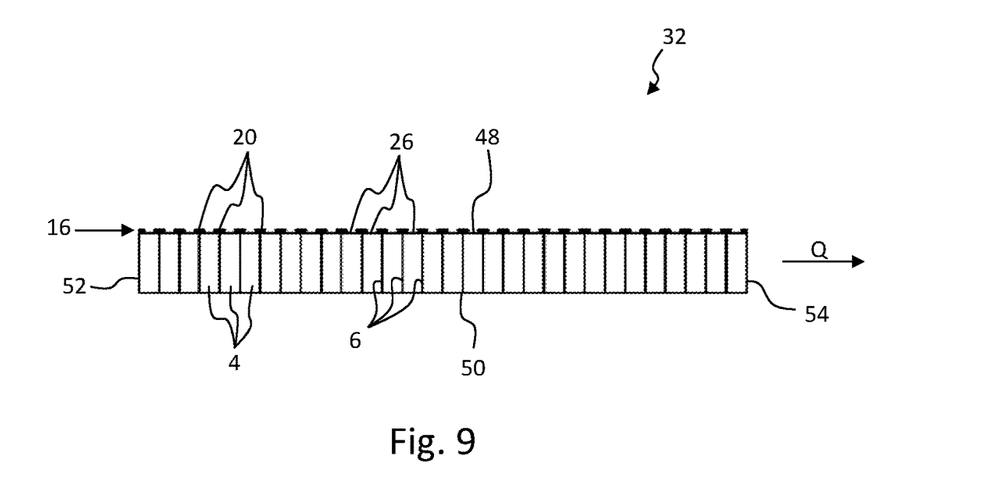
FIG. 9 shows a cross section through a first embodiment of a sealing tape according to the invention.

In the embodiment according to FIG. 9, the cover layer 6 has been parted in the longitudinal direction L in the area of each foam strip 4 of the plurality of foam strips 4, preferably parted by the removal of certain areas of the cover layer 16 in the areas 26 between the subsections 20 of the cover layer 16 to be formed. Because each subsection 20 of the cover layer 16 then partially covers two adjacent foam strips 4 and is bonded to these two foam strips, each subsection 20 covers precisely one barrier layer 6. Each subsection 20 is preferably bonded to this barrier layer 6; for example, it can be adhesively bonded or laminated to it.

It can be seen from the cross-sectional view that, as a result, the subsections 20 increase the contact surface by which a barrier layer 6, in the installed state, can rest against a section of masonry wall. This will be made clear on the basis of FIG. 13.

It is preferred that the cover layer 16 be parted in the middle of each associated foam strip 4. The cut 22 which is introduced into the cover layer 16 to part it or the area 26 in which a certain amount of the cover layer 6 has been removed is therefore arranged in the center of the strip and extends in the longitudinal direction L on the side forming the surface 48 of the sealing tape 32 of each foam strip 4. Each cut 22 or area 26 is therefore arranged symmetrically between the side surfaces of a foam strip 4 which are parallel to the side surfaces 52, 54 of the sealing tape 32. Each cut 22 or area 26, however, is also a certain distance away in the transverse direction Q from a barrier layer 6 to ensure that each barrier layer 6 is covered by a subsection 20 of the cover layer 16.

It can also be seen that the barrier layers 6 preferably extend continuously from the bottom surface 50 to the top surface 48 of the sealing tape 32 (and thus also continuously from the bottom surface 10 to the top surface 8 of the foam-barrier layer web 2). It is also conceivable that the barrier layers 6 could extend only part of the way through the sealing tape 32; for example, they could extend part of the way alternately from the top surface 48 and the bottom surface 50; or some of the barrier layers 6 could extend continuously from the bottom surface 50 to the top surface 48 of the sealing tape 32, and the other barrier layers 6 could extend only part of the way through the sealing tape 32. The configuration of the barrier layers 6 depends essentially on the method used to provide the foam-barrier layer web 2 and on the sealing properties required of the sealing tape 32, especially the sealing properties associated with the resistance to the diffusion of water vapor.

Figure 10:
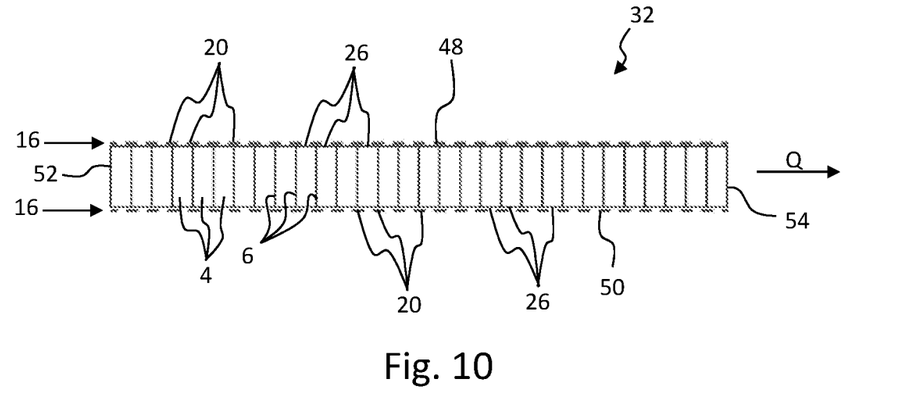
FIG. 10 shows a cross section through a second embodiment of a sealing tape according to the invention.

FIG. 10 shows that a cover layer 16 can be arranged on the top surface 48 of the sealing tape 32 (or on the top surface 8 of the foam-barrier layer web 2), and that a cover layer 16 can also be provided on the bottom surface 50 of the sealing tape 32 (or on the bottom surface 10 of the foam-barrier layer web 2). The cover layer 16 on the bottom surface 50 can be configured identically to the cover layer 16 on the top surface 48; i.e., it can consist of the same material and comprise subsections 20 which have been formed and arranged symmetrically to the subsections 20 of the cover layer 16 on the top surface 48. The cover layer 16 on the bottom surface 50, however, could also be different from the cover layer 16 on the top surface 48; for example, it could be made of a different material, have different dimensions, or be formed by different methods.

Figure 11:
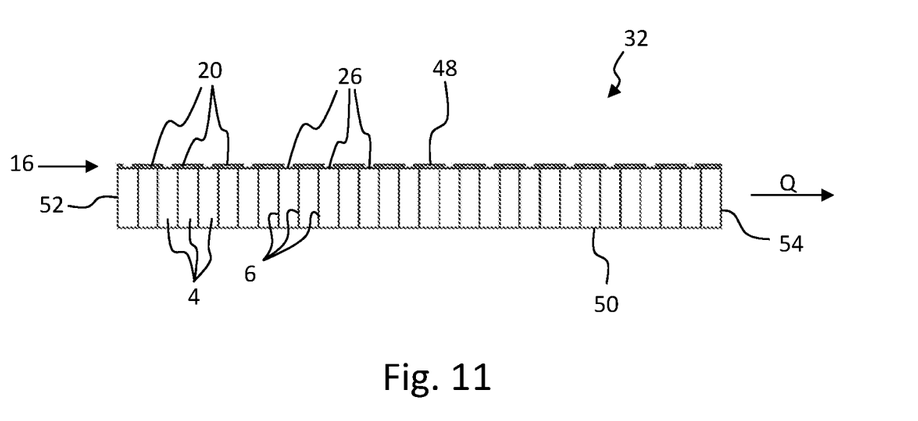
FIG. 11 shows a cross section through a third embodiment of a sealing tape according to the invention.

In the embodiment according to FIG. 11, the sealing tape 32 (and thus also the foam-barrier layer web 2) comprises a plurality of barrier layers 6, and a subsection 20 of the cover layer 16 at least partially covers at least three adjacent foam strips 4. More precisely, a subsection 20 in the illustrated embodiment covers one foam strip 4 completely and the foam strips 4 adjacent on the right and left partially. Each subsection 20 is preferably bonded to all three of the foam strips 4 at least partially covered by it.

It is obvious that the subsections 20 can also cover more than three foam strips 4 in this manner. Of the foam strips 4 covered by a subsection, each subsection 20 partially covers the foam strips in the outermost positions in the transverse direction Q and covers completely the foam strips 4 arranged between these two. In addition, each subsection 20 of the cover layer 16 covers all of the barrier layers 6 which are arranged between the foam strips 4 covered by it. It must be kept in mind, however, that it is preferred that the number of subsections 20 to be produced is sufficient to ensure the necessary flexibility of the top surface 48 of the sealing tape 2. The subsections 20 of the cover layer configured in this way can also be produced by parting the cover layer 16 by at least one cut 22 or by removing certain areas of the cover layer 16.

Figure 12:
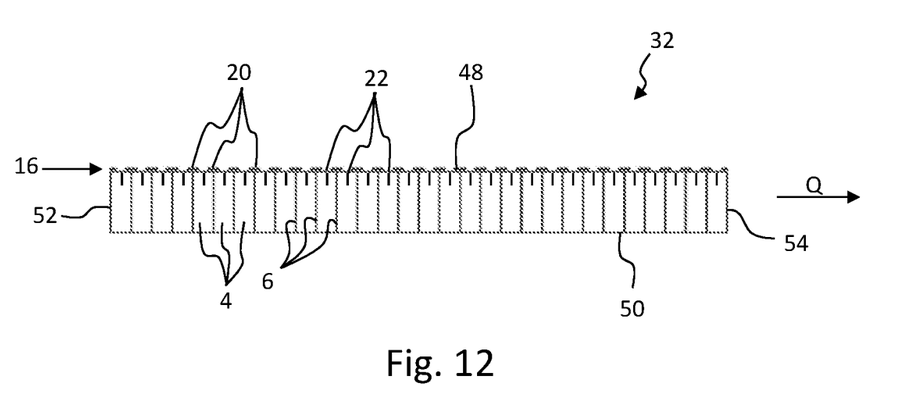
FIG. 12 shows a cross section through a fourth embodiment of a sealing tape according to the invention.

FIG. 12 shows an embodiment in which the cover layer 16 has been parted by the introduction of at least one cut 22. As can be seen in FIG. 12, the cuts 22 also penetrate into the foam of the associated foam strip 4. The integrity of the sealing tape 32 in the transverse direction Q and the sealing properties of the sealing tape 32 remain essentially unaffected as long as the depth of the cuts 22 into the foam strip 4 is shallow, preferably no deeper than a maximum of 1-2 mm. In particular, the introduction of the cuts 22 even into the foam of the foam strips 4 should not lead to the situation that the sections of the sealing tape 32 thus formed bend away from each other or that the foam strips 4 are in fact completely separated from each other. A lack of integrity in the transverse direction Q such as this reduces the stiffness of the sealing tape 32 in the transverse direction Q and therefore makes it more difficult to handle the sealing tape 32.

Figure 13:
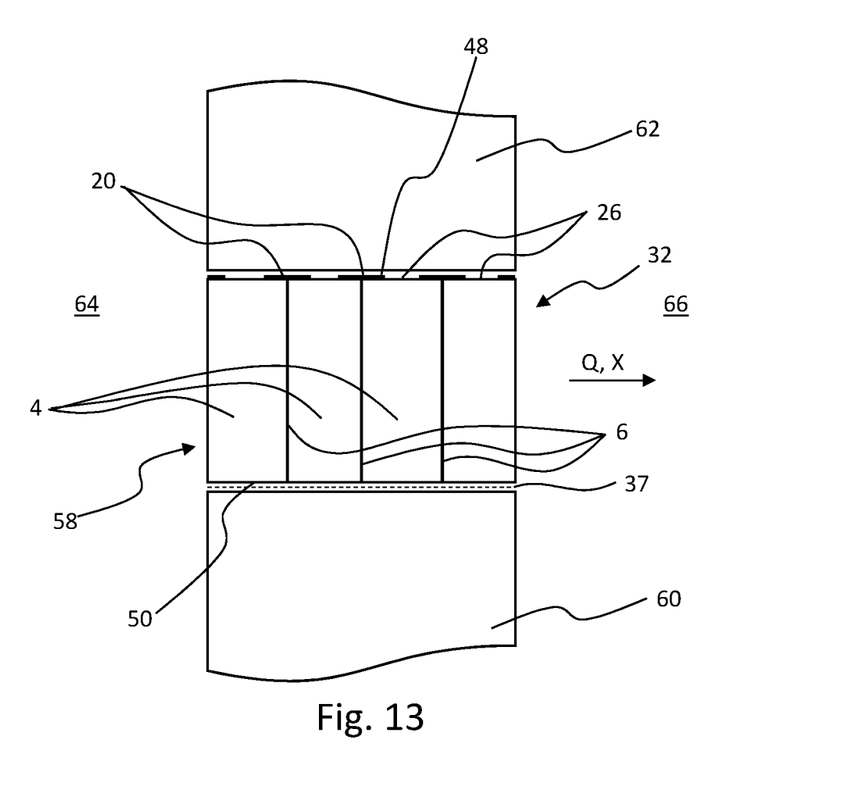
FIG. 13 shows a schematic cross-sectional view of an installed state of a sealing tape according to the invention.

FIG. 13, finally, shows a schematic diagram of an installation state of a sealing tape 32 according to the invention. In this installed state, the sealing tape 32 has been inserted into a joint 58, formed between a frame element 60 (such as a window frame or a door frame) and a section of masonry wall 62. The joint 58 extends from the interior 64 of the room to the exterior 66 of the room between the frame element 60 and the masonry wall section 62. The sealing tape 62 is arranged in the joint 58 in such a way that the transverse direction Q of the sealing tape 32 is oriented from the interior 64 of the room to the exterior 66 of the room or the other way around, and the longitudinal direction L (perpendicular to the plane of the drawing) extends around the periphery of the frame element 60 in the joint.

The sealing tape 32 is usually attached to the frame element 60 by an adhesive layer 37 on its bottom surface 50, and its top surface 48 rests against the masonry wall section 62. The barrier layers 6 extend peripherally in the joint 58 around the frame element 60, i.e., in the longitudinal direction, and from the frame element 60 to the masonry wall section 62. In this way, the sealing tape 32 seals the joint 58 between the interior 64 of the room and the exterior 66 of the room in a functional direction X, which is parallel to the transverse direction Q.

The subsections 20 of the cover layer 16 are arranged on the top surface 48 of the sealing tape 32 and are preferably bonded both to the adjacent foam strips 4 and to the at least one adjacent barrier layer 6. As a result, the contact surface between the barrier layer 6 and the masonry wall section 62 is increased, which guarantees that at least part of the surface of the subsection 20 facing the masonry wall section 62 will rest against the masonry wall section 62. Because the subsection 20 is also bonded to the barrier layer 6, the goal is achieved that it is impossible for water vapor to diffuse around the barrier layer 6 between an edge of the barrier layer and the masonry wall section 62, but it is also impossible for it to diffuse between the barrier layer 6 and the associated subsection 20 of the cover layer 16. The water vapor impermeability of the sealing tape 32 is thus increased. It is obvious that the sealing tape 32 can also be arranged in the joint 58 in such a way that the bottom surface 50 of the sealing tape 32 rests against the masonry wall section 62 and the top surface 48 of the sealing tape 32 rests against the frame element 60. Alternatively, both the top surface 48 and the bottom surface 50 of the sealing tape 32 could also be provided with subsections 20 of a cover layer 16. All of the other embodiments described herein can also be inserted into a corresponding joint in analogous fashion.

The invention claimed is:

1. A method for producing a sealing tape roll, comprising the following steps in the order given:
provimding a foam-barrier layer web, which comprises a plurality of foam strips arranged next to each other in a transverse direction, wherein a barrier layer is arranged between each pair of adjacent foam strips, wherein the foam-barrier layer web has a top surface, a bottom surface, and two side surfaces connecting the top surface and the bottom surface together, and wherein a longitudinal direction of the foam-barrier layer web is parallel to the bottom surface of the foam-barrier layer web and transverse to the transverse direction;
applying a cover layer to the top surface and/or bottom surface of the foam-barrier layer web to form a coated foam-barrier layer web;
parting the cover layer in the longitudinal direction in an area of at least two foam strips and a certain distance away from each barrier layer adjacent to these two foam strips, thus forming subsections of the cover layer, wherein a subsection of the cover layer at least partially covers at least two adjacent foam strips, wherein parting of the cover layer comprises introducing at least one cut into the cover layer, wherein the at least one cut is introduced only into the cover layer, or the at least one cut is introduced into the cover layer and penetrates into the associated foam strip, and wherein the depth of the at least one cut in the foam strip is a maximum of ⅓ of a thickness of the foam strip between the top surface and the bottom surface of the foam-barrier layer web; and
forming a sealing tape roll by: (i) winding up the coated foam-barrier layer web around a rotational axis into a sealing tape roll; or (ii) winding up the coated foam-barrier layer web around a rotational axis into an intermediate roll and parting the intermediate roll at one or more points in an axial direction to produce a plurality of sealing tape rolls, which are narrower than the intermediate roll; or (iii) parting the coated foam-barrier layer web in the longitudinal direction to form foam-barrier layer strips and winding up the foam-barrier layer strips around a rotational axis into individual sealing tape rolls.

2. The method of claim 1 wherein parting of the cover layer in the longitudinal direction is executed in an area of each foam strip of the plurality of foam strips.

3. The method of claim 1 wherein parting of the cover layer is executed in a middle area of the associated foam strip.

4. The method of claim 1 wherein the subsections of the cover layer form strips which are arranged next to each other in the transverse direction and are parallel to each other in the longitudinal direction.

5. The method of claim 1 wherein the foam-barrier layer web comprises a plurality of barrier layers, and a subsection of the cover layer at least partially covers at least three adjacent foam strips.

6. The method of claim 1 wherein parting of the cover layer comprises removing certain areas of the cover layer between the subsections of the cover layer to be formed.

7. The method of claim 6 wherein the step of removing certain areas of the cover layer comprises melting the cover layer, milling-away the cover layer, or cutting and removing certain areas of the cover layer.

8. The method of claim 1 further comprising bonding the cover layer to the foam strips of the foam-barrier layer web before parting the cover layer.

9. The method of claim 1 wherein, when the cover layer is bonded to the foam strips of the foam-barrier layer web, the cover layer is also bonded to the at least one barrier layer.

10. The method of claim 1 further comprising bonding of at least one subsection of the cover layer to the at least one barrier layer which is arranged in an area of the subsection.

11. The method of claim 1 wherein the at least one barrier layer extends from the top surface to the bottom surface through the entire foam-barrier layer web.

12. The method of claim 1 wherein the cover layer is made of a film-like material or an adhesive.

13. The method of claim 12 wherein the cover layer is made of a film web, or a film strip, or an adhesive tape strip, or an adhesive-like fluid medium.

\* \* \* \* \*